June 12, 1951 W. L. CARNEGIE 2,556,676
ROTOR BLADE CONSTRUCTION
Filed June 9, 1944 3 Sheets-Sheet 1

Inventor
William L. Carnegie
By Blackmor, Spencer & Flint
Attorneys

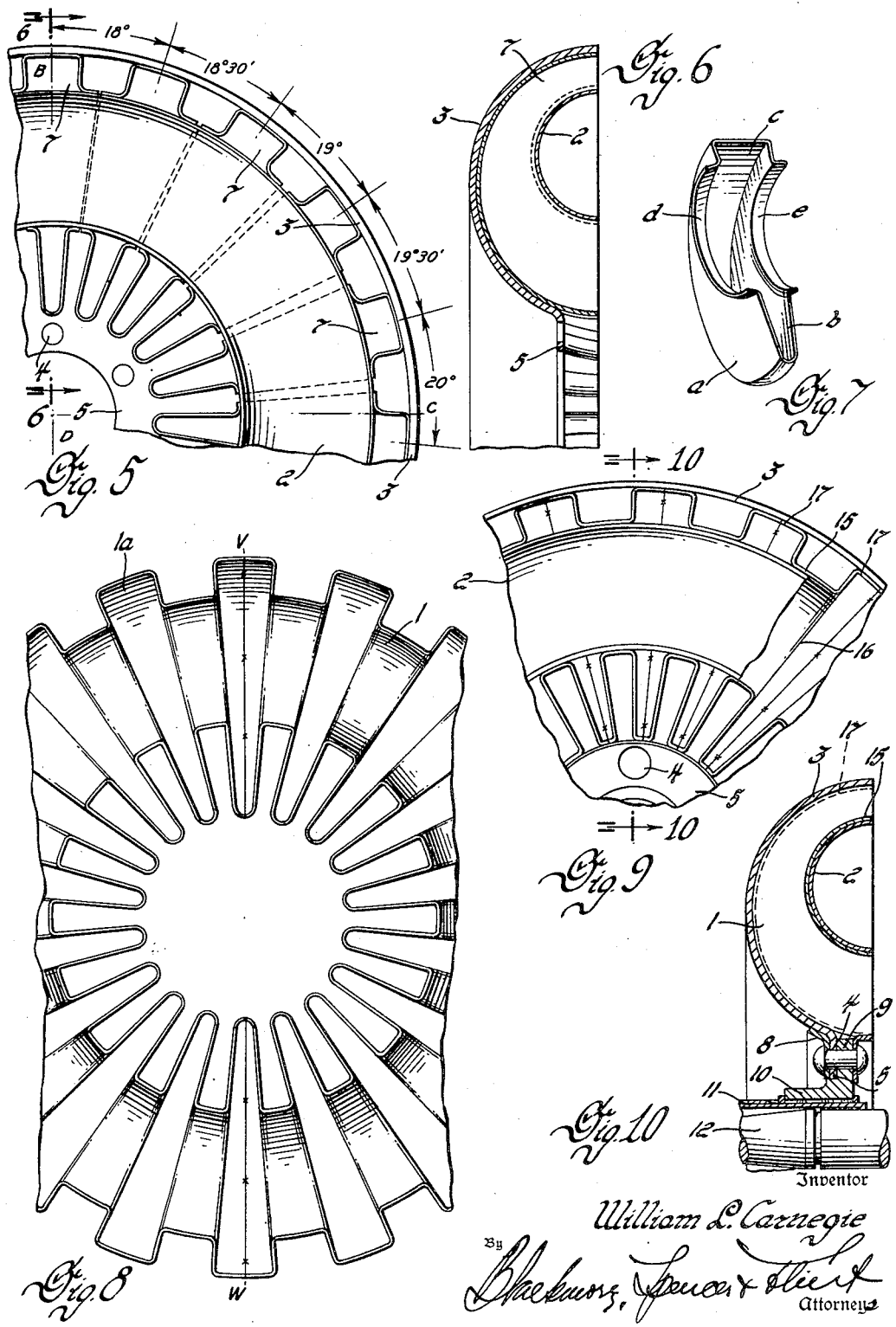

June 12, 1951  W. L. CARNEGIE  2,556,676
ROTOR BLADE CONSTRUCTION

Filed June 9, 1944  3 Sheets-Sheet 3

Inventor
William L. Carnegie
By
Blackmore, Spencer & Hirt
Attorneys

Patented June 12, 1951

2,556,676

UNITED STATES PATENT OFFICE 2,556,676

ROTOR BLADE CONSTRUCTION

William L. Carnegie, Detroit, Mich., assignor to General Motors Corporation, Detroit, Mich., a corporation of Delaware Application June 9, 1944, Serial No. 539,494

5 Claims. (Cl. 103—115)

The present invention relates to a construction of rotors for blade power transmission devices, and in particular to composite constructions involving the use of sheet metal for rotor blade guide rings and supporting shells.

It is well known, to form the essential parts of rotors for turbines, centrifugal pumps and similar devices for handling fluid by stamping or shaping same into the required configurations, mounting the parts in jigs or holding devices, and bonding them together by welding, soldering, or brazing, and by crimping or bending the pieces so as to lock them in place. Such operations require very high accuracy not only in initial manufacture, but also in assembling the parts for mutual attachment. Such operations are lengthy, expensive, and unless accurately controlled, result in a finished piece, which, operated in a mechanism running at medium or high speeds may vibrate very badly, impairing the life of the associated machinery.

A known method in this art is to form the blades of stampings, to slot the core rings or supporting shells, or both; to insert the blades in the slotted portions and finally lock them together by bending protruding portions, or by the aforesaid brazing, soldering or welding. All of these methods require a considerable amount of machining which multiplies the cost factors to an extent detrimental to wide public use.

The present invention therefore improves upon these methods, by providing a preforming of the entire blade assembly into unitary or multiple pieces which not only include the radial flanges of the blades, but also includes the curved back wall portions of the blade pockets and the curved core ring portions, as will be understood upon study of the following specification. The object is accomplished by starting with a metal strip or a flat circular disk, or with a conical disk, and die stamping same into the required shapes. The piece so formed may therefore be a single piece which wholly includes all of the elements of the blades and one half of the blade pocket back walls. In the one case where it is made from a strip, the ends of the piece are joined together by welding or equivalent means, and in the other case wherein it is made from the disc, the single piece will have all of the pocket elements complete in one strip without the necessity of joining the ends.

It is therefore an object of the present invention to provide an improved blade construction in hydraulic drive transmitters, which enables the assembly to be formed and put together with extreme simplicity, from a low number of unit parts, or a single piece.

A further object of the invention is to provide a rotor construction of the aforesaid nature wherein the complete blade assembly inserts are formed by stamping, rolling or pressing in dies.

A secondary object of the invention is to achieve a rotor assembly of the above noted type wherein the whole blade assembly may be stamped or rolled from a single strip of material, or from a unitary piece such as a metal disk, flat or conical. A further objective is to provide an assembly of the above noted nature in which the finished blade insert piece includes the whole boundary area of the blades and of alternate blade pockets, making a complete multiple blade element when attached to a shell and a core ring.

It is a supplementary object to provide in such a device an improved construction wherein a high proportion of mechanical strength is achieved with a very low factor of weight.

It will be observed that the finished article described herein consisting of the unitary multiple blade insert element or member, the attached core ring, and the attached surrounding shell form an assembly in which the blades are supported with torsional flexibility, but with radial rigidity so that torque shock and torque vibration may be absorbed by the mass of the affixed core ring and by the resiliency of the blades, in a manner to dampen vibration, assisted by the energy absorbing power of the working liquid flowing through the vane pockets.

Figure 5 is a modification of the structures described in the preceding figures in which individual pockets are made of separate stampings, and Figure 6 is a radial section of the disclosure of Figure 5, on line 6—6.

Figure 7 is a perspective view of a single pocket made in accordance with the disclosure of Figures 5 and 6.

Figures 1, 2, 3, 4:
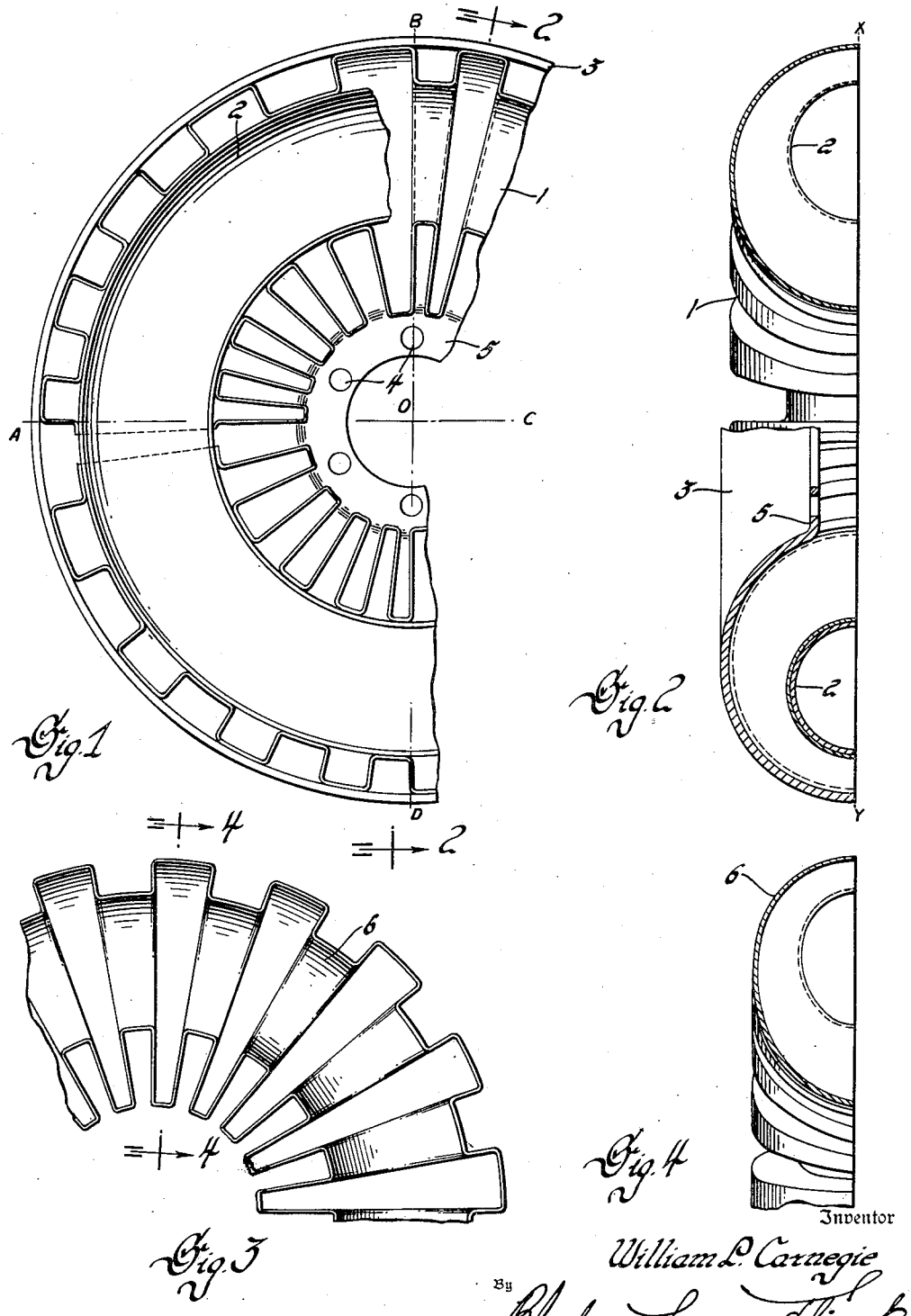
Figure 1 is a plan view of a multiple stamped blade assembly showing the pockets in transverse section.
Figure 2 is a radial sectional view on line 2—2 of the assembly of Figure 1, with the external shell cut away in part, to demonstrate the method of assembly.
Figure 3 is a view of a modification of the showing of Figure 1, in which the entire blade assembly insert is stamped from a single metal disk, instead of being single-lapped as in Figures 1 and 2.
Figure 4 is a view similar to that of Figure 2, showing a part sectional arrangement in a radial plane of the structure of Figure 3, on line 4—4.

In Figure 3 is a plan view similar to Figures 1, 3 and 5, of a further modification in which the blade assembly is composed of two pieces joined together on a 180° radial line, at the mide-line of the pockets.

Figure 9 is a further modification resembling the disclosure of Figure 5, but with the adjacent parts of the pockets joined on the larger radial portions instead of on the shorter radial portion of the core ring.

Figure 10 is a side elevation view of the assembly shown in Figure 9 on line 10—10, and is similar to Figures 2, 4 and 6.

Figure 11:
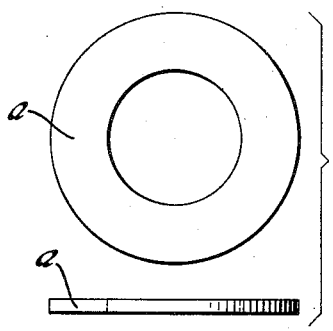
Figure 12:
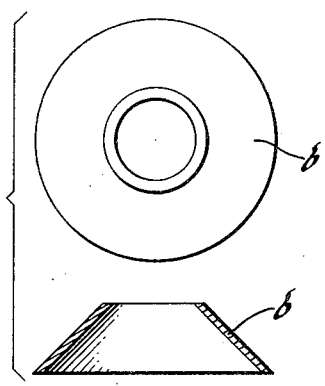

Figs. 11 and 12 represent the forming stages of the single-piece blade ring element from the flat to the conical condition.

Figure 13:
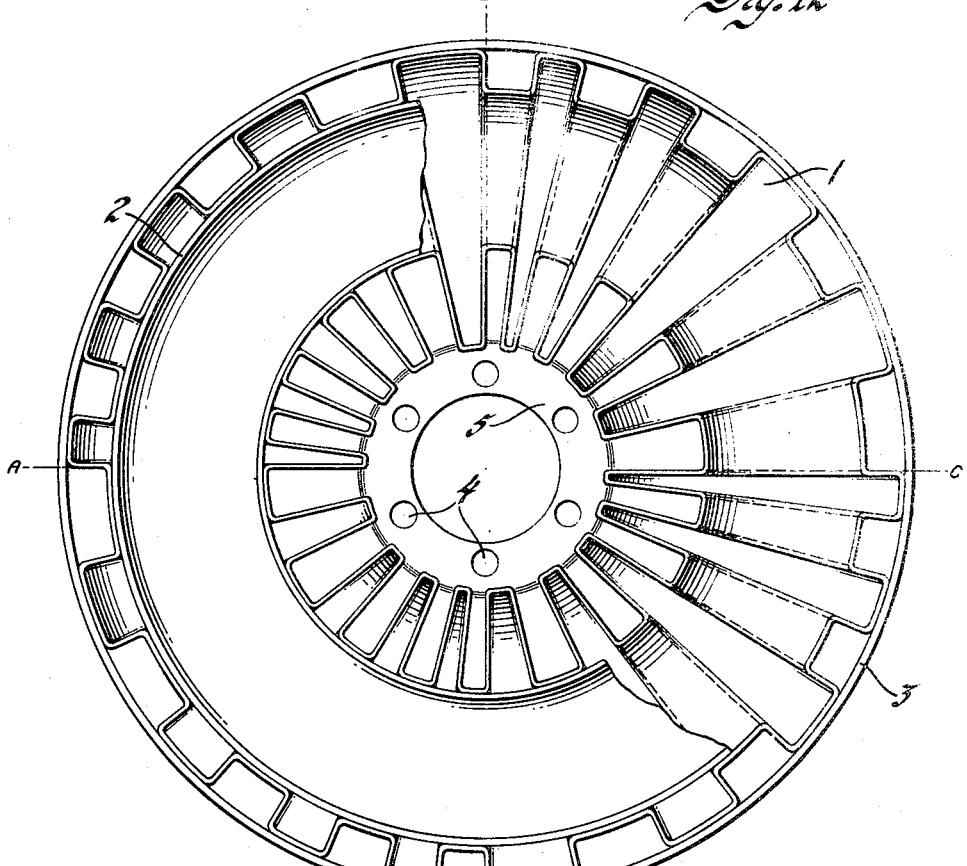

Fig. 13 shows the one-piece blade ring element as assembled, generally following the showings of Figs. 1, 3 and 8.

In Figure 1, the vane sections are shown in clockwise quadrants lettered clockwise A to B, to C, to D, and back to A. It will be noted that the next vane pocket above the line A—O is of smaller circumferential width than the pocket ending at and adjacent the line O—B, and this sequence of incrementally increasing pocket width is repeated clockwise around the whole periphery of the piece, in each quadrant.

In the manufacture of the assembly, the piece 1 is stamped in depth as shown in Figure 2 and is formed circumferentially as shown in Figure 1 into a succession of pockets of constantly varying circumferential width. For purposes of dynamic balance the number of vanes in the quadrant A—O—B are the same in the quadrant C—O—D, and those of the quadrant B—O—C are the same as in the quadrant D—O—A.

It will be noted that the ends of the formed strip 1 are joined in the quadrant A—O—D near the line A—O. They are also attached to the core ring element 2. After stamping or pressing, the formed multiple blade pocket element 1 may be attached by spot welding to the core ring 2, this operation being performed in a holding jig in order to maintain dynamic accuracy. The assembled core ring 2 with the blade pocket member 1 may be then inserted in place in the shell member 3 and welded, the positioning holes 4 in flange 5 permitting the necessary jig alignment. Alternatively, the three pieces 1, 2 and 3 may be assembled together in a clamping jig after the surfaces to be welded or brazed have been prepared, such as by prior copper plating, next with the assembly locked in the clamp, and then inserted in a hydrogen brazing furnace in accordance with present day brazing practice where the three parts are firmly bonded together by the action of the furnace heat. After cooling and normalizing, the composite assembly is then mounted and is machined off on the plane of the line X—Y of Figure 2 to remove the edges of metal projecting from member 1 in particular, those left from the die operation. If desired this planing off operation may be prior to welding or brazing, to rough dimension, and the final operation of surfacing the projecting edges of the parts requires then only a light final cut.

The composite device herein being of uniform dimension to its axis of revolution, lends itself readily to a bonding operation which consists of treating the adjacent surfaces to be bonded with a welding or bonding substance such as electroplated copper, silver, high temperature silver-phosphor materials and the like, mounting the parts in a holding fixture under mechanical pressure sufficient to obtain bond area contact, and subjecting the composite to high frequency oscillator electricity, selective to surface heating, for melting the bonding agent, and then cooling the rotor, normalizing by slow cooling, or by separate operation.

It is also possible to weld the assembly together after surface treatment by resistance welding, the accuracy of formation and uniform mechanical pressure permitting uniform area contact between one large electrode in which the shell rests and a second electrode fitting the core ring, as well as uniform area contact between shell and pocket projections and between pocket webs or flanges and the core ring. Any of these operations may proceed with exclusion of air, and in a hydrogen or other gaseous atmosphere, it being understood that an inert gas atmosphere may likewise be used.

From this point on, the composite piece consisting of blade pockets 1, core ring 2, and shell 3, is ready for the final balancing test whereafter the shaft flange (not shown) is bolted or riveted through the holes 4 to shell member 3.

Heretofore, in any prior art showings resembling the article described in Figures 1 and 2, no provision has been made for obtaining uninterrupted radial fluid flow while utilizing the volumetric space in full, between the vane pockets. For example, the radial vane section which lies along the line A—O separates the vane pocket below formed by the metal of piece 1 from a space which can only be enclosed by the external shell 3. Following around the assembly it will be noted that such a space exists between each completely formed vane pocket. It has been found in practise that no disadvantages derive from the slight change of radial width of core ring at the bridging portions of the formed vane pockets and the radial dimension at the point where the core ring section lies inside of a vane pocket. Upon reflection it will be understood that the slight differentiation in the physical dimension of the core ring in the alternate pocket spaces may generate a differential fluid velocity component which has the net effect tending to break up periodic frequency impulses otherwise experienced in cast fluid flywheels having complete uniform radial and circumferential dimensions in the pockets.

In Figure 3 the piece 6 is equivalent to piece 1 of Figure 1, but is made from a disk either flat or conical, being stamped in depth as shown in Figure 4, and formed circumferentially as shown in Figure 3. This piece is treated exactly as described above in connection with the assembly of the multiple blade element with the core ring 2 and the shell 3.

Figure 5 presents a somewhat different method of building up a composite blade assembly of individually stamped blade pockets 7, assembled on a core ring 2 and inside a shell 3 as shown in Figure 6. Whereas in Figure 3 the circumferential spacing of the blade pockets departed from that of Figure 1, all being of the same circumferential width, the showing of Figure 5 is taken with a pocket center to center circumferential spacing in degrees of arc differing one from the other by 30'.

In the present demonstration it starts in each half with a minimum of 18° and ends with a maximum of 22° as taken from point B clockwise, the opposite spacing in the left hand half increasing from the narrow 18° spacing adjacent to point D, around through A to the wider 22° spacing ending at point B.

It will be noted that this method of affixing the blade pockets individually to the core ring 2 and the shell 3 makes it possible to use a single form of pocket, struck from the same die, but spaced as shown, to break up what otherwise might be resonance periods, which phenomena create unpleasant noises and injurious vibrations. The assembly of Figures 5 and 6 may be welded or brazed in positioning jig or clamps as described above.

In Figure 7 the form of a single blade form pocket such as used in the assembly of Figures 5 and 6 is provided in a projection view. The pocket member is composed of two facing vane sections a and b, a back-wall section c and two opposing flange sections d and e. Since vane sections a and b are straight radial except for their curvature where they meet the back-wall section c, it is extremely simple to form and use a male and female die arrangement with the die-mating entrant plane in which the initial flat sheet lies, coinciding with the plane of the sheet.

In the view shown in plan in Figure 8, the half conical ring or flat strip is pressed in a die with continuous webs left between the vane pockets, as shown, the circumferential spacing of the vane pockets being all of the same dimension. To make a complete half torus vane pocket assembly, two formed pieces like those of the figure, after being pressed in depth and shaped circumferentially, are attached to each other along the line V—W which will be noted requires a joining across the radial centers of two opposite vane pockets. These two halves may be attached individually to the core ring, or may be attached to each other at the same time joining with the ring takes place. The assembly of external shell, core ring, and the two vane pocket pieces may also be mounted in a jig for simultaneous thermal bonding, as required, with the slight excess of metal removed from the parting plane area as described above.

Figure 9 is a sectional plan view similar to Figures 1, 3, 5 and 8, but resembling that of Figure 5 more closely in assembly method. In this arrangement, the individual vane pockets are made up of pieces symmetrical with a central web 15 formed to fit the core ring 2, flanged radially to form blades 16 on either side thereof, and the latter extensions flanged circumferentially and shaped as at 17 fit the shell 3. Adjacent pieces fit together at the mid-line of the vane pocket, the flanges 17 abutting circumferentially. When it is desired to have a stronger and more rigid core ring, this method is preferred. While Figure 9 shows uniform circumferential spacing, it is obvious that the scalar quadrant spacing of Figure 1 or the half-circumferential spacing of Figure 8 may be used, where speeds, inertias and harmonic period ranges require especial care for elimination of siren and torque shock effects.

In Figure 10, the sectional view shows the relationship of the blade pocket element 1, the core ring 2, and the shell member 3 when they are finally assembled in the finished piece, and it will be noted that the hub stamping extends inward radially to form a flange 9 co-extensive with the similar flange 5 of the shell 3, and the stiffening flange 8, the three flanges being drilled equidistantly for affixing to the hub 10, splined internally on sleeve 11 surrounding shaft 12. This method of mounting the composite rotor member on its hub may be utilized in all of the variations of disclosure given herein.

It is stated above that the blade ring section 1 of this assembly was susceptible of forming in dies from a single circular blank. The blank a of Fig. 11 is cut to precalculated dimensions by a stamping die, to the ring form. A second die operation upsets the ring to the conical form b of Fig. 12, and the following die operations flute the cone into the shape shown in Fig. 13, with a section like those of Figs. 2, 4, 6 or 10.

The latter step may require staging of a set of die operations which graduate the stretching action so as to avoid cracking at points of greater stress. It may also include a rolling die operation, if required, rather than a compression action.

The successive circumferential pattern of blade pocket widths of Fig. 13 is shown on a quadrant basis, the spacing of A—B being repeated in B—C, and in D—A. This same pattern appears in Fig. 1, however the pattern may be like those of Figs. 3, 5 and 8.

The specific die-operation technique is not claimed herein, the invention being directed to the providing of a single-piece fluted article of the nature described.

In the processing of the strip or sheet metal for making the rotors above described, it will be understood that a preliminary shaping of the metal to be eventually formed into vane pocket members, may be obtained by rolling the flat conical stock through rolling dies, which if desired, may be a successive series of die roller pieces of increasing depth, sufficient to complete the normal formation of the piece in as few as three rolling die operations. With certain grades of strip or sheet metal it is possible to form the plural vane member pieces in one master rolling operation, although it will be understood by those skilled in the art that for units with relatively deep vane pockets, a final forming die following the rolling operation will be preferably used.

Since the herein described composite rotor is difficult to make because of the many reentrant sections to be formed, it may require the rotor after thermal bonding, to be finally inserted in a master correcting die, not only for gauge purposes, but also for straightening any small warp inequalities resulting from the heating. If desired, the rotor, while in the straightening die, may be heated to remove internal stresses, the temperature applied being below the yield point for the welding or brazing material; or a rotor may be heat-treated separately without being inserted in a die, and then finally polished and trimmed to the exact specifications.

It is known to form multiple blade strips from a single piece but the present novel disclosure is believed to be the first to teach the formation of complete blade pockets in a continuous piece, the advantages including the creation of absolutely smooth flow spaces in the pockets, not obtainable in previously shown constructions of this character. The construction avoids the necessity of preliminary notching of strips to be processed for making multiple blades, saving the metal otherwise cut away, to strengthen the zones of support and attachment while leaving the blade portions of unit thickness and flexibility. It will be observed that in welding, the present method of blade member forming makes it possible to thicken the metal at the critical support zones, for better avoidance of weld burning.

From the foregoing it will be understood that the novel method of forming a composite blade rotor construction introduces a considerable saving, both in time and in material, since the die operations described may proceed very quickly in presses or machines designed for the purpose, and there is practically no material waste, and no expenditure for machining and finishing, except in knocking off the burrs and in applying the final dimensional trimming. It is advantageous to be able to make a complete rotor out of as few pieces as possible, and to so form it that the radial and circumferential paths of flow of the liquid within the vane pockets are not obstructed by tabs or other projections such as appear in present day welding assemblies of this nature. The present method makes it possible, for example in single vane pocket processing as shown in Figure 7, to machine the flanges of the vanes for the assembly of Figures 5 and 6 radially along the portions d and e so that abutting of the vane pocket flanges leaves the circumferential spaces between the pockets entirely uniform; or otherwise these may be spaced in a geometrical or arithmetical sequence by quadrants rotationally, in the herein above described manner to suit the engineering requirements of the finished piece. By this method the separate pocket core ring flanges, being pre-cut to circumferential dimension, may all be made abutting, so that there is no differential flow space in the interstitial flow zone at the core ring. While this refinement has not been found in practice to be essential in certain common installations, since the fluid flow energy is concentrated in the vane pockets toward the outward periphery, rather than adjacent the core ring, the flow losses for all practical purposes while negligible with respect to pocket flange spacing on the core ring may become high at high rotor speeds. It is advantageous to pre-form an assembly as described above, lock same in a welding jig or clamp, and bond the assemblies together in one operation, which the teaching herein permits. It is further advantageous when making more than one vane pocket in a single piece, to join the ends to the formed plural blade pocket member along a larger diameter in the case of the two piece blade ring of Figure 8. Experience has also proven the usefulness of joining the two ends of the single piece disclosed in Figure 1 at a core ring flange point, in the case of the use of quadrant spacing progression. In all of the rotors described, the blade pockets or channels have axial inlet and outflow channels connecting flow zones in which the flow direction is radial, the drawings showing co-planar inlets and outlets, it being obvious that these areas may be taken in accordance with designer's need, so that there is not a co-planar reference for both inflow and outflow channel areas.

Considerable utility is attained by maintaining radial rigidity of the structure, while permitting torsional flexibility, which will be understood affords absorption means for torsional vibration, as described above. Excessive twisting force carried by the blades may cause the core ring mass to travel ahead of, or lag behind the shell, or to oscillate between advanced and retarded positions with an accompanying distortion of the vane pocket shapes. This permits local excess fluid pressure force within the rotor to be dissipated in part through the torsional yielding of the structure.

These and other advantages described in this specification are believed clearly shown in the present teaching as set forth in the objects of invention stated in the beginning paragraphs herein.

It should be clearly understood that the structures described are explanatory, and by way of example, and that the teachings and principles provided herein are susceptible of many other applications by those skilled in the art, without departing from the invention, which is therefore to be limited only by the scope of the appended claims, and may appear in various modifications without departing from the spirit of the invention.

I claim:

1. In composite rotor structures having a series of radial blades spaced circumferentially, a vane construction for a multiple blade rotor built up from a shell of toroidal section and having a core ring of toroidal section, said construction including a member intermediate said shell and core ring made from a single piece of material pressed to form radial blade sections, toroidal backwall and core ring sections adjacent each blade section, and a circumferential spacing of the said blade sections by the said backwall and core ring sections in which the blade-to-blade distances in each quadrant increase from a smaller dimension progressively to a larger dimension.

2. In fluid drive devices especially for those in which torque is transmitted by the radial and axial flow of liquid moving in a toroidal space, the combination of a composite rotor formed of a blade pocket member made from a continuous ring-shaped piece having multiple blade pockets with complete backwall webs extending over the full toroidal circumferential distance of the blade pocket, and constituting inter-blade curved backwall sections circumferentially continuous with the full radial length of the adjacent blades, a toroidally curved core ring to which are attached interstitial webs co-extensive between the vane pocket portions of said member, and a semi-toroidal shell to which the said member is attached, the internal face of the shell affording an uninterrupted flow guide surface for the interstitial pockets formed between the said first-named pockets and the said web portions, and the said shell being attached to the adjacent portions of said pockets projecting away from the zone of attachment of the said core ring to said web portions.

3. A vane construction for a multiple blade rotor built up from a shell, a core ring, an intervening member having complete blade pockets formed therein alternating between toroidally curved core ring webs, said pockets having backwall sections continuous with the full radial dimension of the adjacent blades, said intervening member being formed from a circumferentially continuous sheet, and an assembly of said shell, core ring and member providing a second alternate set of complete blade pockets having backwalls supplied by said shell, front walls by said webs and joining lateral walls formed by the adjacent outer faces of said first-named pockets.

4. A vane construction for a multiple blade rotor built up from a shell, a core ring, and an intervening member having complete vane pockets pressed therein alternating between radially curved core ring webs, said member being formed from a complete ring of metal.

5. A blade pocket construction for a multiple blade rotor built up from a shell, a core ring, and an intermediate member composed of a continuous ring-shaped piece having complete blade pockets pressed therein alternating between joined radially-curved core ring webs, said webs presenting an uninterrupted radial fluid flow surface adjacent said ring and the inner wall of said shell likewise presenting a corresponding uninterrupted radial fluid flow surface in the spaces interstitial to said pockets, and the forming of a second set of complete blade pockets alternating between said first-named set, the said second set having backwalls provided by said webs and lateral walls common to the adjacent lateral faces of said first-named pockets.

WILLIAM L. CARNEGIE.

REFERENCES CITED

The following references are of record in the file of this patent:

UNITED STATES PATENTS

| Number | Name | Date |
| --- | --- | --- |
| 1,572,972 | Tabb | Feb. 16, 1926 |
| 2,216,747 | Klimek | Oct. 8, 1940 |
| 2,256,988 | Michailoff | Sept. 23, 1941 |
| 2,336,231 | Dodge | Dec. 7, 1943 |
| 2,357,295 | Thompson | Sept. 5, 1944 |
| 2,368,725 | Pentz | Feb. 6, 1945 |
| 2,387,722 | Dodge | Oct. 30, 1945 |
| 2,392,858 | McMahan | Jan. 15, 1946 |
| 2,394,353 | Zelleck | Feb. 5, 1946 |
| 2,398,203 | Browne | Apr. 9, 1946 |
| 2,405,146 | Huber | Aug. 6, 1946 |
| 2,405,190 | Darling | Aug. 6, 1946 |
| 2,426,746 | Price | Sept. 2, 1947 |
| 2,428,134 | Zeidler | Sept. 30, 1947 |

FOREIGN PATENTS

| Number | Country | Date |
| --- | --- | --- |
| 250,542 | Great Britain | Feb. 19, 1926 |
| 419,252 | Great Britain | Nov. 8, 1934 |